United States Patent
Brown

[11] Patent Number: 5,673,486
[45] Date of Patent: Oct. 7, 1997

[54] METHOD AND APPARATUS FOR STRIPPING A WIRE END

[75] Inventor: Joseph E. Brown, Liverpool, N.Y.

[73] Assignee: The Remarcable Co., Inc., Syracuse, N.Y.

[21] Appl. No.: 572,989

[22] Filed: Dec. 15, 1995

[51] Int. Cl.⁶ .................................................. H02G 1/12
[52] U.S. Cl. .................................................. 30/90.1; 81/94
[58] Field of Search ............................ 30/90.1, 93, 94, 30/95, 96, 97; 81/9.4, 9.44, 9.51

[56] References Cited

U.S. PATENT DOCUMENTS

| | | |
|---|---|---|
| 1,306,588 | 6/1919 | France . |
| 2,112,396 | 2/1938 | Corrigan . |
| 3,074,301 | 1/1963 | Carpenter ........................ 81/9.51 |
| 3,540,333 | 11/1970 | Johnson . |
| 3,667,328 | 6/1972 | Stolshek ........................... 81/9.4 |
| 3,772,945 | 11/1973 | Varga . |
| 4,436,001 | 3/1984 | Ergler . |
| 4,498,362 | 2/1985 | Steinke et al. . |
| 4,589,313 | 5/1986 | Meyers et al. . |
| 4,641,562 | 2/1987 | Clarke . |
| 4,682,919 | 7/1987 | Mitchell . |
| 4,746,395 | 5/1988 | Lampe et al. . |
| 4,945,636 | 8/1990 | Takizawa ........................... 81/9.4 |
| 4,987,801 | 1/1991 | Brown . |
| 5,056,388 | 10/1991 | Dekker et al. . |
| 5,074,043 | 12/1991 | Mills ................................. 30/91.1 |
| 5,105,542 | 4/1992 | Nakajima et al. ................. 81/9.4 |

*Primary Examiner*—Hwei-Siu Payer
*Attorney, Agent, or Firm*—Arthur A. Chalenski, Jr.

[57] ABSTRACT

A rotary wire end stripper has a rotatable cutting head which has a cutting blade carrier block that pivots between an operative and an inoperative position. The carrier block is spring-biased to the inoperative position and has a weight that is positioned to move the carrier block to the operative position under the centrifugal force of rotation of the cutting head. The cutting head forms annular slits of predetermined depth in the coverings of the wire which forms annular "slugs" that are removed after the wire end is withdrawn from the device.

17 Claims, 3 Drawing Sheets

METHOD AND APPARATUS FOR STRIPPING A WIRE END

BACKGROUND OF THE INVENTION

1. Field of the Invention

This invention relates to methods and apparatuses for stripping end portions of wires and cables, and more particularly to stripping the various layers of insulation and conductive shield material from a center conductor cable such as coaxial cable and the like.

2. Discussion of the Prior Art

Coaxial cable such as that used in transmitting data, television signals and computer network signals usually has a center conductor encapsulated in a dielectric material that is overlaid with a conducting shielding layer, all of which is usually encased in an outer protective jacket. In order to connect one end of a cable to another, a termination must be fixed mechanically and electrically to the conductive portions of the cable to permit connection to terminal strips and other cable ends. Independent electrical connections to both the center conductor and electrically shielding layers must be established to permit functioning of the cable. Insulations and shields are of wide varieties and types of materials and pose a significant problem in the industry in their removal for good electrical connections. While stripping of these materials may be done manually, it is a very tedious and difficult job and frequently the conductor or shield is either nicked or severed in an unwanted fashion so as to seriously affect the electrical properties thereof. This is particularly important in the high-speed data transmission type of cable where conductors tend, at high frequencies, to carry most of their electrical information on the surface of the conductor and even a small scratch or nick can seriously interrupt the flow of electrical information.

For the above reasons, power operated rotary strippers have been developed for accurately and quickly stripping the ends of coaxial type wires and cables. These have generally involved apparatuses such as that shown in U.S. Pat. No. 3,074,301 to Carpenter which has one or two pivotally mounted blades adapted to pivot out of the way as the wire is inserted into the device and then to cam into single cut cutting position as the cutting head is rotated and the wire end is withdrawn from the device. These devices have generally worked well for the removal of a single segment of the outer covering and have usually necessitated the use of multiple devices to remove the several layers of different material from a conductor.

Attempts have been made to remove two or more segments from the end of a multi-layered conductor, but they have generally encountered the insurmountable problem of the removal from the cutting device of the one or more "slugs" remaining after cutting the various layers of the wire coverings. Two- and three-bladed strippers have been attempted, however, none have been successful because of continual jamming caused by the "slugs" hanging up between the knives within the rotary cutting head.

One stripping device which eliminated many of the problems described above is shown in U.S. Pat. No. 4,987,801. In that device, a spring-biased reciprocating carrier block holds the cutting blades. The carrier block is weighted, and the carrier block moves under centrifugal force, upon rotation of the cutting head, to an operative cutting position. The cutting head creates annular slits of a predetermined depth which formed annular slugs which are removed when the wire is withdrawn from the device.

SUMMARY OF THE INVENTION

It is an object of the present invention to facilitate stripping multiple slugs of insulating and shielding material from a central conductor without the drawbacks of the prior art. It is another object of the present invention to provide a powered wire end stripping device for precisely slitting the various layers of materials surrounding a central conductor so as to permit removal of the layers without injury to the conducting members of the cable. It is another object of the present invention to provide a device for quickly and accurately removing the insulation and shielding of a coaxial cable in precise discrete segments. It is another object of the present invention to provide a device that will rapidly and accurately cut the insulation, shielding and protective coating of a coaxial cable, each to its appropriate depth for removal therefrom without jamming of the slugs in the device. It is another object of the present invention to provide a device for accurately and quickly slitting annular rings of a precise depth equal to the particular layer of insulating and/or shielding material to be removed, simultaneously along the end of a coaxial-type cable. It is a further object of the present invention to provide a compact, portable field use unit for stripping the ends of coaxial-type cables. It is finally an object of the invention to provide a stripping device which has less friction, allows more cuts to be made, is effected less by RPM fluctuations, and has a fixed distance of travel for the cutting blade assembly.

In one form of the present invention a rotary cutter head is provided with a pivotally-mounted knife carrier that is brought into cutting contact with the insulation and shielding layers to be cut by centrifugal action as the cutter head is rotated, to quickly and accurately form annular slits of precisely-desired depth in the cable coverings to facilitate later removal of the slit portions.

BRIEF DESCRIPTION OF THE DRAWINGS

These and other objects, features and advantages of this invention will be more fully understood from the ensuing detailed description of the preferred embodiment of the invention which description should be read in conjunction with the accompanying drawings, wherein.

DETAILED DESCRIPTION OF THE INVENTION

Figure 1:
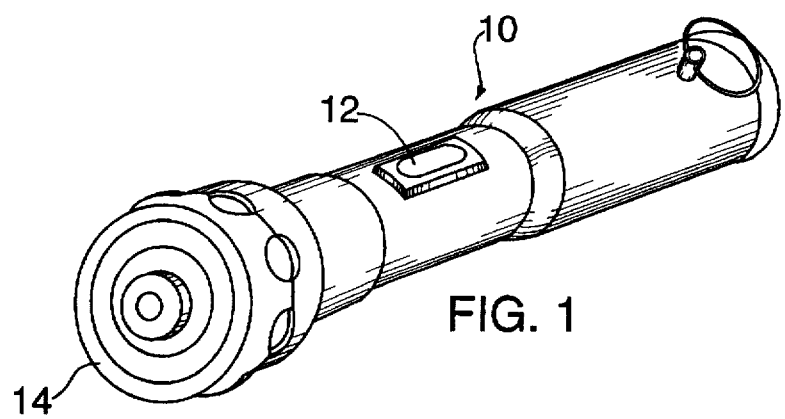
FIG. 1 is a perspective view of a device embodying the present invention.

Referring now to FIG. 1, there is shown a portable battery operated wire stripper 10 embodying the present invention. The stripper 10 is of a type generally available which has a battery pack to operate the device which may be recharged by plugging into a suitable charging device. Stripper 10 has an on/off switch 12 and a wire guide/safety cover 14 removably attached at the cutter head end of the stripper 10 to guide the wire end to be stripped properly into the cutter head and to protect the operator from the rotating cutter head. A prior art stripper of this type is shown in U.S. Pat. No. 4,987,801.

Figure 2:
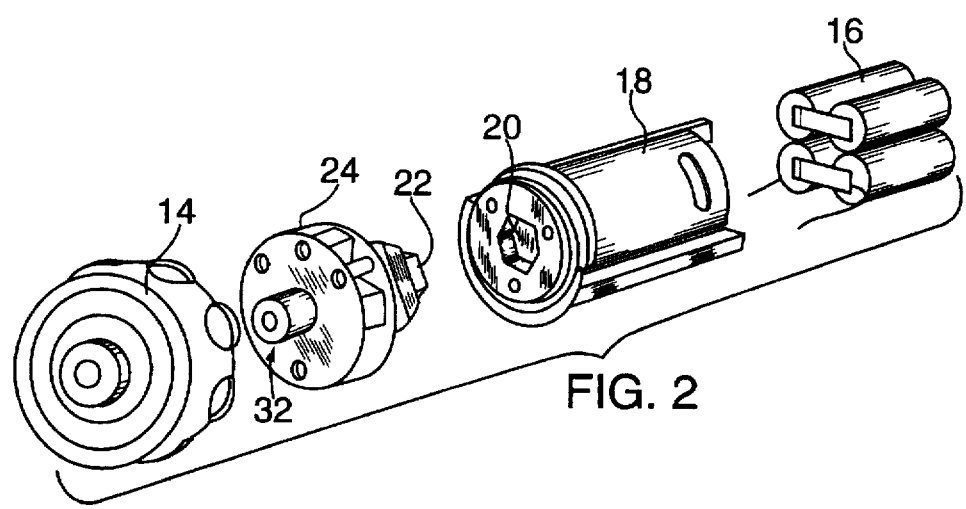
FIG. 2 is a view similar to FIG. 1, partially exploded to show the cutting head of the present invention.
Figures 3, 6, 7:
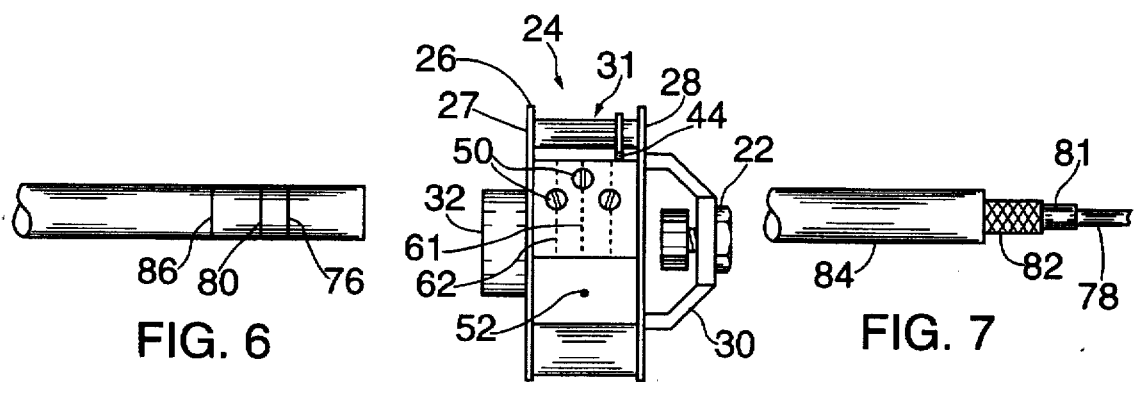
FIG. 3 is a left side elevational view of the cutter head.
FIG. 6 is a view of a wire end cut in accordance with the present invention.
FIG. 7 is a view similar to FIG. 6 showing the insulation layers remaining after removal of the insulation and shield "slugs" that were slit in FIG. 6.

As may be seen in FIG. 2, the device consists generally of the power pack 16, the drive motor assembly 18 which has a gear reducer (not shown) and drive receptacle 20 in the driven end thereof adapted to receive therein the hexagonal, rectangular, square, or other shaped projection 22 on the bottom of the cutting head 24 as may be seen more clearly in FIG. 3 herein.

Referring to FIGS. 3, 4, 5a and 5b, the cutter head 24 includes a frame portion 26 which has a pair of flat plates 27 and 28 joined together to define a radial chamber adapted to pivotally receive therein a cutting blade carrier block 36. A yoke portion 30 is mounted on plate 28 and carries on its outer extremity the nut 22 which meshes with the drive unit's hexagonal, rectangular, square or other shaped receptacle 20. The other plate 27 carries a central wire guide member 32 which extends into one side of the cutting aperture of the cutting head 24 to form a support against which the cutting action takes place. The hole in the central wire guide member 32 through which the wire is inserted may be round, or may have inside corners in order to aid in locating the wire to be cut. The axis of this hole is radially offset towards the cutting blades 61 in order to provide a wire end supporting surface which positions the axis of the wire to be cut in axial alignment with the wire stripper 10. The yoke 30 has threadably inserted through the hexagonal, rectangular, square or other shaped projection 22 an adjustable threaded stop 34 which may be adjusted to limit the distance the wire end can be inserted into the cutting head 24.

A counterbalance weight 52 and standoffs 31, 31' are secured to the plates 27 and 28 by screws. Mounted between the plates 27 and 28 is a cutting blade carrier block assembly 36 which can be seen in more detail in FIGS. 4, 5a and 5b. The carrier block assembly 36 includes a generally central rectangular opening 42 which surrounds the wire cutting operational area and allows the wire end from outside of the stripper 10 to be inserted to contact the stop 34 when the device is not energized. A blade clamping and mounting block 38 is fashioned on one side of the opening 42 and a centrifugal weight 40 is mounted by bolts on the opposite side. The block 38 can carry anywhere from one to four blades, as desired, and has a series of support and clamping devices as shown in FIGS. 5a and 5b and as will be described in detail in connection therewith. The assembly 36 is pivotally mounted by a pin 104 between the plates 27 and 28 in the cutting head 24 and is spring-biased to the position shown in FIG. 5b by a spring 44. A stop formed by the standoff 31', as may be seen in FIG. 5a, is provided to limit the movement of the cutting blade carrier block assembly 36.

Figure 4:
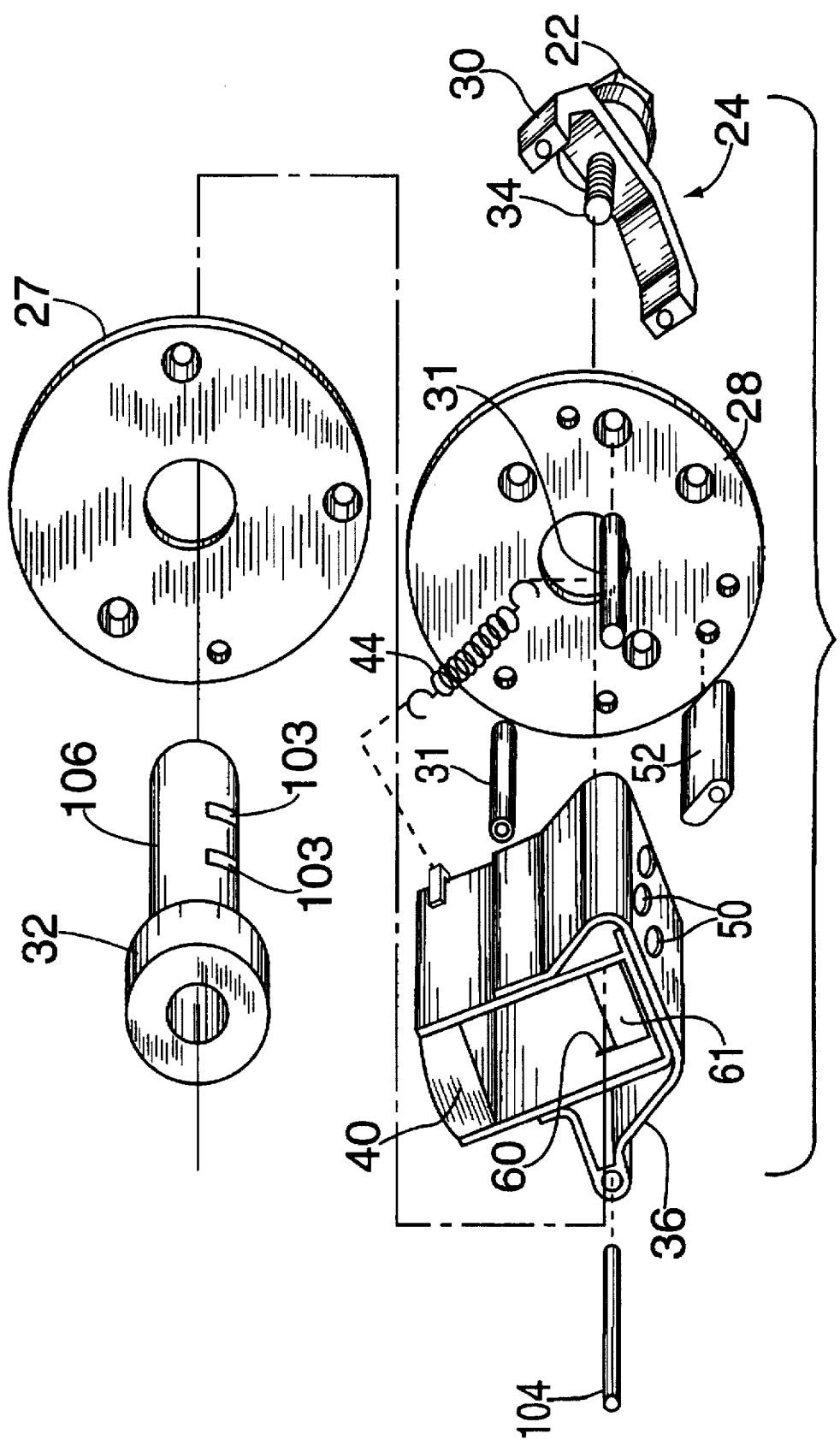
FIG. 4 is an exploded view of the cutter head.
Figure 5A:
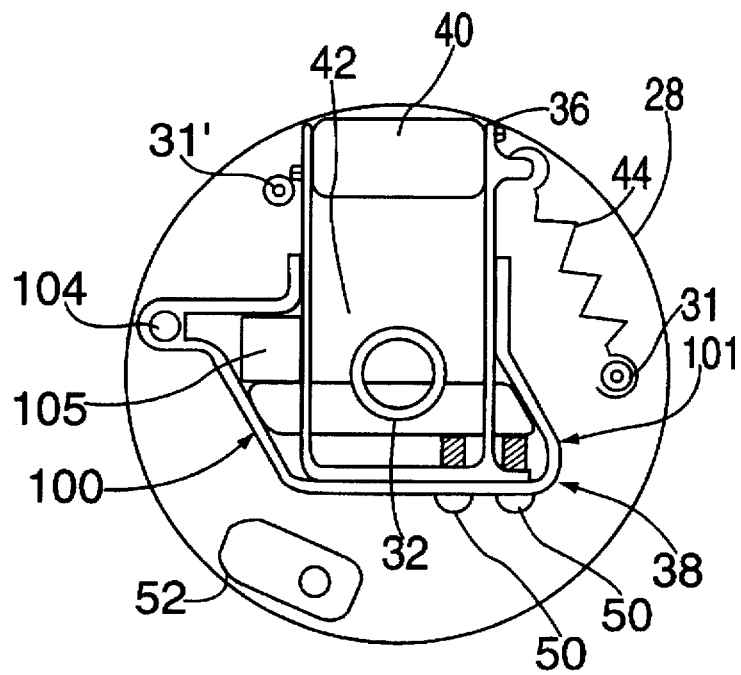
FIGS. 5a and 5b are detail views of the carrier block of the present invention, in cutting and non-cutting positions, respectively.
Figure 5B:
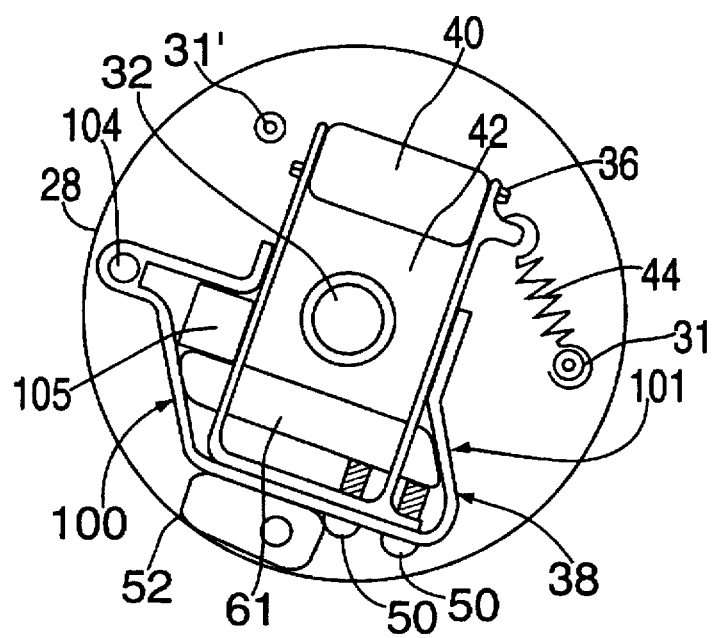

Referring now to FIGS. 4, 5a and 5b, there is shown a cutting block assembly 36. The blade clamping and mounting end 38 has one or more cutting blades 61 mounted in slots 60 and located at one end by stop screws 50. Parallel and offset walls 100, 101 in blade clamping and mounting end 38 interact with angled ends of cutting blades 61 to allow cutting blades 61 to slide to different radial locations upon turning stop screws 50. A resilient material 105, such as closed cell silicon foam, is provided at an end of blades 61 opposite stop screws 50 to hold blades in place against stop screws 50. The blades 61 are accurately positioned in the slots 60 by stop screws 50, resulting in the precise position of the cutting blades to permit slitting to the exact desired depth. Precise depth of cut is extremely important in coaxial cables for data transmission and similar uses as described above.

A first blade 61 may be fixed to cut through the insulation and shielding layers of the wire end to form cut 76 in the wire end without nicking the center conductor 78 (FIGS. 6 and 7). A second blade 61 adjacent to first blade 61 is positioned to make cut 80 which leaves the inner insulation layer 81 intact, but cuts the shield 82 and outer covering 84. A third blade 61 can cut only the outer covering 84 at 86 to expose the shield 82. It will be understood that each blade 61 will be set to cut to the desired depth and the spacing between the blades will be set for the particular wire end termination desired.

Referring now to FIG. 5b, the cutter blade carrier block 36 is shown in the de-energized position with clear access for the wire end to be inserted through the cutting head 24 in supporting alignment in wire guide 32 to abut adjustable stop 34. The blade assembly is spring urged into the position shown in FIG. 5b by the spring 44 as previously described. This position is limited by the abutting of the outside of cutter blade carrier block 36 against the radially inner surface of counterbalance weight 52. This position is not critical, as long as the cutting blades 61 are withdrawn from the opening in guide 32. Counter-balance weight 52 is chosen to counter-balance the centrifugal weight 40 when the head 24 is rotated to cause the cutting blades 61 to move to the full cutting position shown in FIG. 5a, to cut the insulation and shielding of the wire end.

When being rotated, the cutting blades 61 are in the position shown in FIG. 5a as the carrier block 36 has been moved to the other end of its pivotal motion by the centrifugal force of rotation. The centrifugal weight 40, in response to rotation of the cutting head, causes the cutting block assembly 36 to move to the position of FIG. 5a, forcing the cutting blades 61 through the slots 103 in a central sleeve 106 of guide 32 and into the various layers of covering of the wire end. The stop formed by the standoff 31' is positioned to limit the penetration of the cutting blades 61 in the guide 32, to make an annular slit around the wire to the desired depth for cutting the various layers of insulation and shielding for later removal without nicking or damaging the next inner layer.

In operation, a wire end is inserted into the device through the cover 14 until the wire end abuts the stop screw 34. At this point the switch 12 is actuated and the cutting head 24 is rotated which, as previously described causes the centrifugal weight 40 to pull the cutting blades 61 into cutting contact with the insulation and shielding layers of the wire end. This results in a series of annular slits being cut in the wire end as may be seen in FIG. 6, which slits sever the various layers to the desired depth. The switch 12 is deactivated and after the rotation stops, the wire end is removed.

When rotation of cutting head 24 stops, the spring 44 retracts the cutting blades 61 from the insulation and this allows the wire end to be removed without attempting to pull off the cut "slugs" which might damage the cutting blades or become jammed between the cutting blades, causing problems in the next cutting operation. After the wire end is withdrawn from the cutting head, the slit layers of insulation and shielding can be easily removed by hand or by another device to prepare the wire end for termination.

The present invention provides a very fast, accurate and precise cutting head for slitting insulation and shielding layers about a wire end to a precise depth to permit stripping thereof in preparation for termination in a connector device. While the invention has been described in the specification and illustrated in the drawings with reference to a preferred embodiment, it will be understood by those skilled in the art that various changes may be made and equivalents may be substituted for elements of the invention without departing from the scope of the claims.

I claim:

1. In a rotary wire stripper for stripping an end of a coaxial cable of the type having a center conductor encapsulated in one or more layers of insulation and conductive shields, a rotary cutting head comprising:

a generally cylindrical-form frame member rotatable about a rotation axis thereof;

a cutting blade carrier block mounted for pivotal motion about an axis parallel to said rotation axis within said frame member;

an elongated central aperture in said carrier block in axial alignment with said axis of said frame member;

a plurality of cutting blades mounted in said carrier block and projecting into said central aperture;

a centrifugal weight mounted on said carrier block opposite said cutting blades;

a guide sleeve mounted in said frame member in axial alignment with said axis of said frame member and extending into said elongated central aperture of said carrier block and having an aperture with a wire end supporting surface radially offset from the rotation axis of said frame member; and a rotating element, said rotating element rotating said frame member so that upon rotation of said frame member, centrifugal force causes said centrifugal weight to move said carrier block radially outwardly, causing said cutting blades to cut into encapsulating layers of a wire end disposed in said guide sleeve.

2. The rotary cutting head of claim 1 further comprising:

a spring mounted between said carrier block and said frame member to hold said carrier block and said blades out of contact with said wire end disposed in said rotary cutting head when said head is stationary.

3. The rotary cutting head of claim 1, further comprising:

a wire stop element mounted in said frame member, said wire stop element axially positioning said wire end to be stripped relative to said blades.

4. The rotary cutting head of claim 1, further comprising:

a carrier block stop element mounted in said frame member, said carrier block stop element limiting pivotal movement of said blade carrier block to precisely control a depth of cutting of said cutting blades.

5. The cutting head of claim 1, wherein:

two cutting blades are mounted in said carrier block at mutually different axial and radial positions relative to said axis of said frame member.

6. The cutting head of claim 1, wherein:

three cutting blades are mounted in said carrier block at mutually different axial and radial positions relative to said axis of said frame member.

7. A rotary wire stripper for stripping layers from an end of a cable comprising:

a rotary cutting head having a wire end receiving aperture;

a cutting blade carrier block mounted in said cutting head for pivotal motion about an axis parallel to an axis of said wire end receiving aperture, said carrier block comprising a central aperture;

at least one cutting blade mounted in said carrier block projecting into said central aperture;

an actuating weight mounted on said carrier block on a side of said carrier block opposite said cutting blade;

a biasing element urging said carrier block in an inoperative position; and a rotary drive, said rotary drive being coupled to said rotary cutting head so that upon rotation of said cutting head, said carrier block is propelled toward said wire end receiving aperture.

8. The rotary wire stripper of claim 1, further comprising:

a wire stop element, said wire stop element being located at one end of said wire end receiving aperture, said wire stop element limiting insertion of a wire end in said wire end receiving aperture.

9. The rotary wire stripper of claim 8, wherein:

said cutting head comprises a counterbalance weight mounted in said carrier block on a side of said cutting head opposite said actuating weight.

10. The rotary wire stripper of claim 9, wherein:

said counterbalance weight acts as a carrier block stop element to limit the movement of said carrier block away from said wire end receiving aperture.

11. The rotary wire stripper of claim 1, further comprising:

a carrier block stop element, said carrier block stop element contacting said carrier block to limit movement of said carrier block toward said wire end receiving aperture.

12. The rotary wire stripper of claim 11, wherein:

said carrier block stop element is a standoff element separating two plates of said cutting head.

13. The rotary wire stripper of claim 1, wherein:

a plurality of cutting blades are mounted in said carrier block at different axial and radial positions.

14. The rotary wire stripper of claim 13, wherein:

three cutting blades are mounted in said carrier block at mutually different axial and radial positions.

15. The rotating wire stripper of claim 1, further comprising:

a wire guide comprising a guide sleeve mounted on a frame member, said guide sleeve having a wire end supporting surface in axial alignment with an axis of said frame member, said guide sleeve extending into said central aperture of said carrier block.

16. The rotary wire stripper of claim 1, wherein:

said carrier block comprises a resilient material provided at an end of said at least one cutting blade to hold said at least one cutting blade in place.

17. A method of stripping an end of a coaxial cable of the type having a center conductor encapsulated in one or more layers of insulation and conductive shields, said method comprising the steps of:

inserting a wire end to be stripped into an annular recess in a rotary cutting device;

rotating said rotary cutting device about said wire end;

pivotally moving, about an axis parallel with an axis of said wire end and by centrifugal force, a plurality of cutting blades pivotally mounted in said rotary cutting device into cutting engagement with said wire end;

cutting a plurality of annular slits in the layers of insulation and shields encapsulating said wire end;

stopping rotation of said rotary cutting device;

withdrawing said cutting blades from engagement with said wire end;

withdrawing said wire end from said annular recess; and removing annularly slit portions of the layers of insulation and shields from said wire end.

* * * * *